United States Patent
Narita et al.

(10) Patent No.: US 7,540,146 B2
(45) Date of Patent: Jun. 2, 2009

(54) FUEL SUPPLY SYSTEM AND FUEL SUPPLY METHOD FOR EXHAUST PURIFYING CATALYST DEVICE IN INTERNAL COMBUSTION ENGINE

(75) Inventors: Yuji Narita, Kariya (JP); Yoshiyuki Takahashi, Kariya (JP); Kenji Kawai, Kariya (JP); Hisanobu Suzuki, Toyota (JP); Yoshitaka Nakamura, Nagoya (JP)

(73) Assignees: Kabushiki Kaisha Toyotal Jidoshokki, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 308 days.

(21) Appl. No.: 11/486,734

(22) Filed: Jul. 14, 2006

(65) Prior Publication Data

US 2007/0022745 A1    Feb. 1, 2007

(30) Foreign Application Priority Data

Jul. 15, 2005    (JP) ............................. 2005-207438

(51) Int. Cl.
F01N 3/36    (2006.01)

(52) U.S. Cl. ............................. 60/286; 60/295; 60/297; 60/301

(58) Field of Classification Search .................... 60/285, 60/286, 295
See application file for complete search history.

(56) References Cited

U.S. PATENT DOCUMENTS

| | | | | |
|---|---|---|---|---|
| 4,138,844 A | * | 2/1979 | Masaki et al. | 60/286 |
| 6,684,852 B2 | * | 2/2004 | Wright et al. | 123/431 |
| 7,152,574 B2 | * | 12/2006 | Mashiki et al. | 123/299 |
| 7,367,323 B2 | * | 5/2008 | Yoshizaki | 123/490 |
| 2003/0209010 A1 | * | 11/2003 | Arnold | 60/285 |
| 2004/0083719 A1 | | 5/2004 | Xu et al. | |
| 2006/0016424 A1 | * | 1/2006 | Gioannini et al. | 123/299 |

FOREIGN PATENT DOCUMENTS

| | | |
|---|---|---|
| EP | 0 886 044 A1 | 12/1998 |
| EP | 0 911 499 A2 | 4/1999 |
| EP | 1 498 594 A1 | 1/2005 |
| JP | 2001-280125 | 10/2001 |
| JP | 2003-201836 | 7/2003 |
| WO | WO 2004/113691 | 12/2004 |

OTHER PUBLICATIONS

European Search Report dated Feb. 13, 2009 issued by European Patent Office for application No. 06117058.5-1263/1744023.

* cited by examiner

*Primary Examiner*—Thomas E Denion
*Assistant Examiner*—Jonathan Matthias
(74) *Attorney, Agent, or Firm*—Locke Lord Bissell & Liddell LLP

(57) ABSTRACT

Cylinder heads are each provided with a fuel injection valve, and an addition nozzle for adding fuel for activating an exhaust purifying catalyst to an exhaust manifold. There exists a non-exhaust period in which an exhaust gas does not flow out to exhaust passages from the exhaust manifolds during an operation of an engine. An ECU controls the addition nozzles in such a manner that the addition nozzles execute a fuel addition during periods except the non-exhaust period. Accordingly, the fuel added to the exhaust manifolds for activating the catalysts is avoided from collecting on a wall surface of an exhaust system without getting on an exhaust stream.

9 Claims, 5 Drawing Sheets

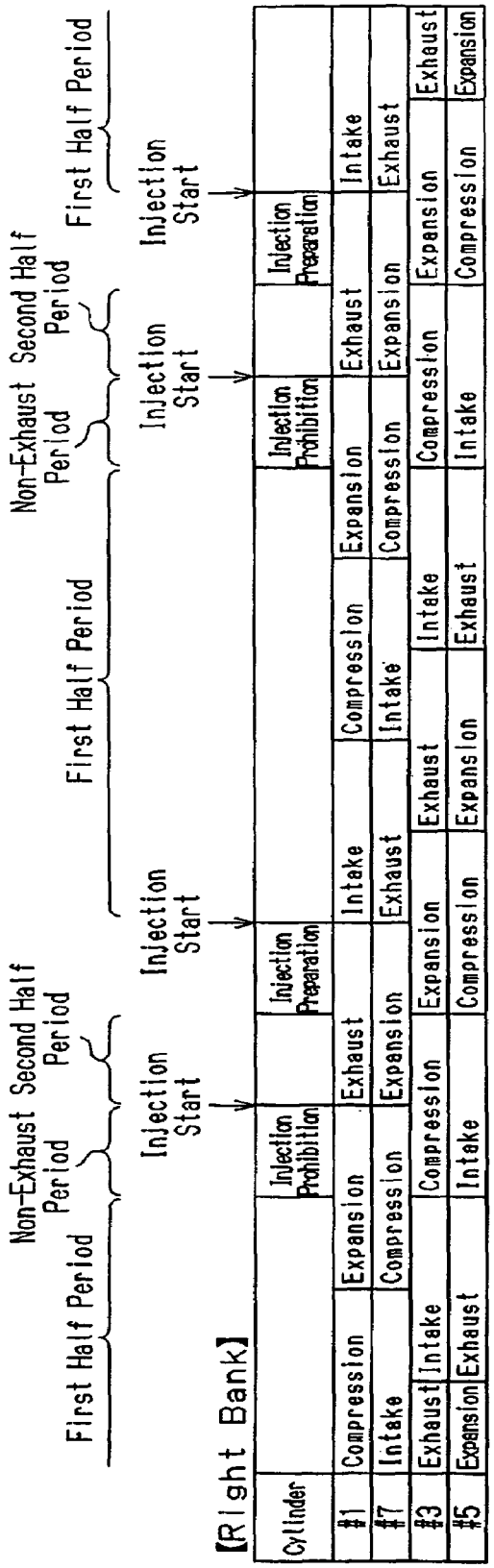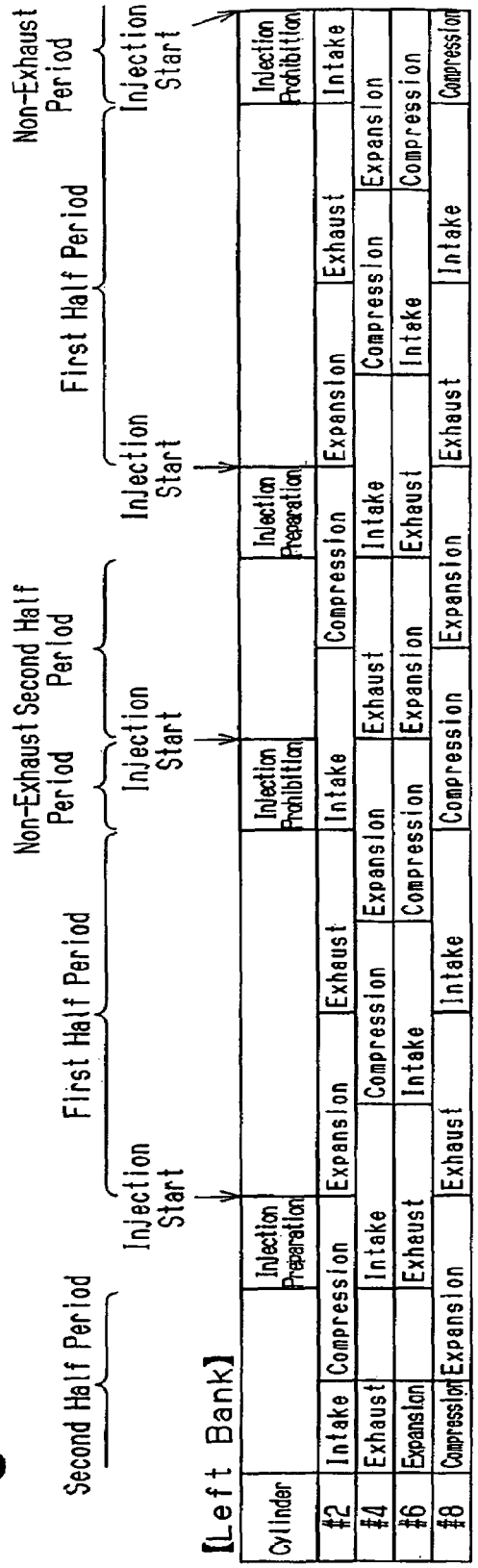

FUEL SUPPLY SYSTEM AND FUEL SUPPLY METHOD FOR EXHAUST PURIFYING CATALYST DEVICE IN INTERNAL COMBUSTION ENGINE

BACKGROUND OF THE INVENTION

The present invention relates to a fuel supply system and a fuel supply method for an exhaust purifying catalyst device in an internal combustion engine. Specifically, the engine is provided with a plurality of cylinders, an exhaust manifold is connected to an exhaust port in each of the cylinders, an exhaust passage is connected to the exhaust manifold, and the catalyst device is provided in the middle of the exhaust passage.

Conventionally, in order to reduce NOx (nitrogen oxide) included in the exhaust gas, there has been taken a countermeasure that an exhaust gas recirculation device (hereinafter, refer to as an EGR device) is installed in an internal combustion engine. In accordance with the countermeasure mentioned above, it is possible to reduce the generation of NOx, however, it has not been yet achieved to do away with the generation of NOx, and NOx is still included in the exhaust gas. Accordingly, a NOx reduction catalyst reducing NOx in the exhaust gas has been developed in recent years. The exhaust purifying catalyst device provided with the NOx reduction catalyst is used together with the EGR device mentioned above, whereby an amount of NOx discharged to the atmospheric air from the engine is further reduced.

In the internal combustion engine having the catalyst device provided with the NOx reduction catalyst as mentioned above, it is necessary to execute the following matters in order to maintain the reduction efficiency of NOx. That is, a NOx reduction capacity of the catalyst is recovered by making an air-fuel ratio of the exhaust gas flowing into the exhaust passage rich at a predetermined timing before a NOx occlusion capacity of the catalyst is saturated, and supplying a reducing agent to the exhaust gas. For example, Japanese Laid-Open Patent Publication No. 2001-280125 and Japanese Laid-Open Patent Publication No. 2003-201836 propose supplying (adding) a fuel as a reducing agent to the exhaust gas.

In a four-cylinder engine in Japanese Laid-Open Patent Publication No. 2001-280125, in order to prevent the fuel serving as the reducing agent added to an exhaust system from circulating in an intake system via an exhaust gas recirculation device, a position of an adding port of a fuel adding nozzle adding the reducing agent (the fuel) and a position of an exhaust gas suction port of the exhaust gas recirculation device are specified. Specifically, an exhaust manifold connected to an exhaust port in each of the cylinders is connected to an exhaust pipe by an exhaust gas collecting pipe. An upstream end of the exhaust gas colleting pipe is connected to one end of the exhaust manifold. The adding port of the fuel adding nozzle is attached so as to face to the exhaust port of the fourth cylinder which is close to the one end of the exhaust manifold. The exhaust gas suction port is provided in the other end of the exhaust manifold. A timing for adding the fuel from the fuel adding nozzle is synchronized with a valve opening timing of the exhaust valve of the fourth cylinder.

Further, Japanese Laid-Open Patent Publication No. 2003-201836 discloses an example in which the fuel adding nozzle adding the fuel serving as the reducing agent is arranged in adjacent to the fourth cylinder in the four-cylinder engine. In the case that the third cylinder is in an exhaust stroke, an exhaust stream toward a distal end of the fuel adding nozzle, that is, a blow-back of the engine exhaust gas is generated within the exhaust port of the fourth cylinder due to a pressure pulsation. Japanese Laid-Open Patent Publication No. 2003-201836 discloses making a pause of the fuel injection from the fuel adding nozzle in the case that the exhaust stream in an opposite direction to the direction of the fuel injected from the fuel adding nozzle is generated. Accordingly, in the four-cylinder engine, it is possible to add fuel to the exhaust gas continuously for a crank angle of 540 degrees to the maximum. In this case, the 540 degrees is determined by subtracting 180 degrees corresponding to an exhaust stroke from a crank angle 720 degrees corresponding to one cycle (intake, compression, expansion and exhaust) of the third cylinder.

The inventors of the present invention made a study of a case that the fuel was added as the reducing agent to each of a left exhaust manifold connected to a left bank and a right exhaust manifold connected to a right bank in an eight-cylinder engine having the left bank and the right bank. The inventors found out that it is not necessary to avoid the back flow of the added fuel caused by the blow-back of the engine exhaust gas by appropriately setting an installed position of the fuel adding nozzle in the 8-cylinder engine, as is different from the existing four-cylinder engine. However, in the case of setting an injecting order to the eight cylinders to a general one, paying attention to the exhaust gas by the four cylinders in one bank, it was confirmed that there was generated a non-exhaust period in which all of the four cylinders did not become in the exhaust stroke. The non-exhaust period means a stroke in which the exhaust gas does not flow out to the exhaust manifold from any one of the four cylinders in the bank and the exhaust gas does not flow out to the exhaust passage from the exhaust manifold by extension. If the fuel is added, that is, injected to the exhaust manifold in the non-exhaust period, the added fuel does not get on the exhaust stream, and the added fuel collects on the exhaust system, for example, the wall surface of the exhaust manifold. Accordingly, considering one bank, the period in which the fuel serving as the reducing agent can be continuously added while avoiding the non-exhaust period comes to the crank angle of 450 degrees to the maximum. That is, it becomes shorter than the continuous crank angle of 540 degrees in the case of the four-cylinder engine.

SUMMARY OF THE INVENTION

Accordingly, it is an objective of the present invention to provide a fuel supply system and a fuel supply method for an exhaust purifying catalyst device in an internal combustion engine. The fuel supply system can add fuel for activating the catalyst device to an exhaust manifold in order to avoid a situation that the fuel collects on a wall surface of an exhaust system without getting on an exhaust stream.

According to one aspect of the invention, a fuel supply system for an exhaust purifying catalyst device in an internal combustion engine is provides. The engine includes a plurality of cylinders each having an exhaust port; and at least one exhaust manifold. Each exhaust manifold is connected to the exhaust ports of the cylinders. An exhaust passage is connected to the exhaust manifold. A catalyst device has a catalyst provided in the middle of the exhaust passage. In the exhaust manifold, there exists a non-exhaust period in which none of the cylinders corresponding to the exhaust manifold is in an exhaust stroke, whereby exhaust gas does not flow out to the exhaust passage from the exhaust manifold. The fuel supply system includes an addition nozzle injecting a fuel to the exhaust manifold for activating the catalyst. A control section controls the addition nozzle so as to add the fuel to the exhaust manifold in a period other than the non-exhaust period.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2A is a time chart showing a relationship among an intake stroke, a compression stroke, an expansion stroke and an exhaust stroke of a first cylinder #1, a seventh cylinder #7, a third cylinder #3 and a fifth cylinder #5 arranged in a right bank of the engine in FIG. 1;

FIG. 2B is a time chart showing a relationship among an intake stroke, a compression stroke, an expansion stroke and an exhaust stroke of a second cylinder #2, a fourth cylinder #4, a sixth cylinder #6 and an eighth cylinder #8 arranged in a left bank of the engine in FIG. 1;

DETAILED DESCRIPTION OF THE PREFERRED EMBODIMENTS

A description will be given below of a fuel supply system for an exhaust purifying catalyst device according to a first embodiment of the present invention with reference to FIGS. 1 to 5. In this embodiment, the fuel supply system is installed in a diesel engine (hereinafter, simply referred to as an engine) mounted on a motor vehicle.

Figure 1:
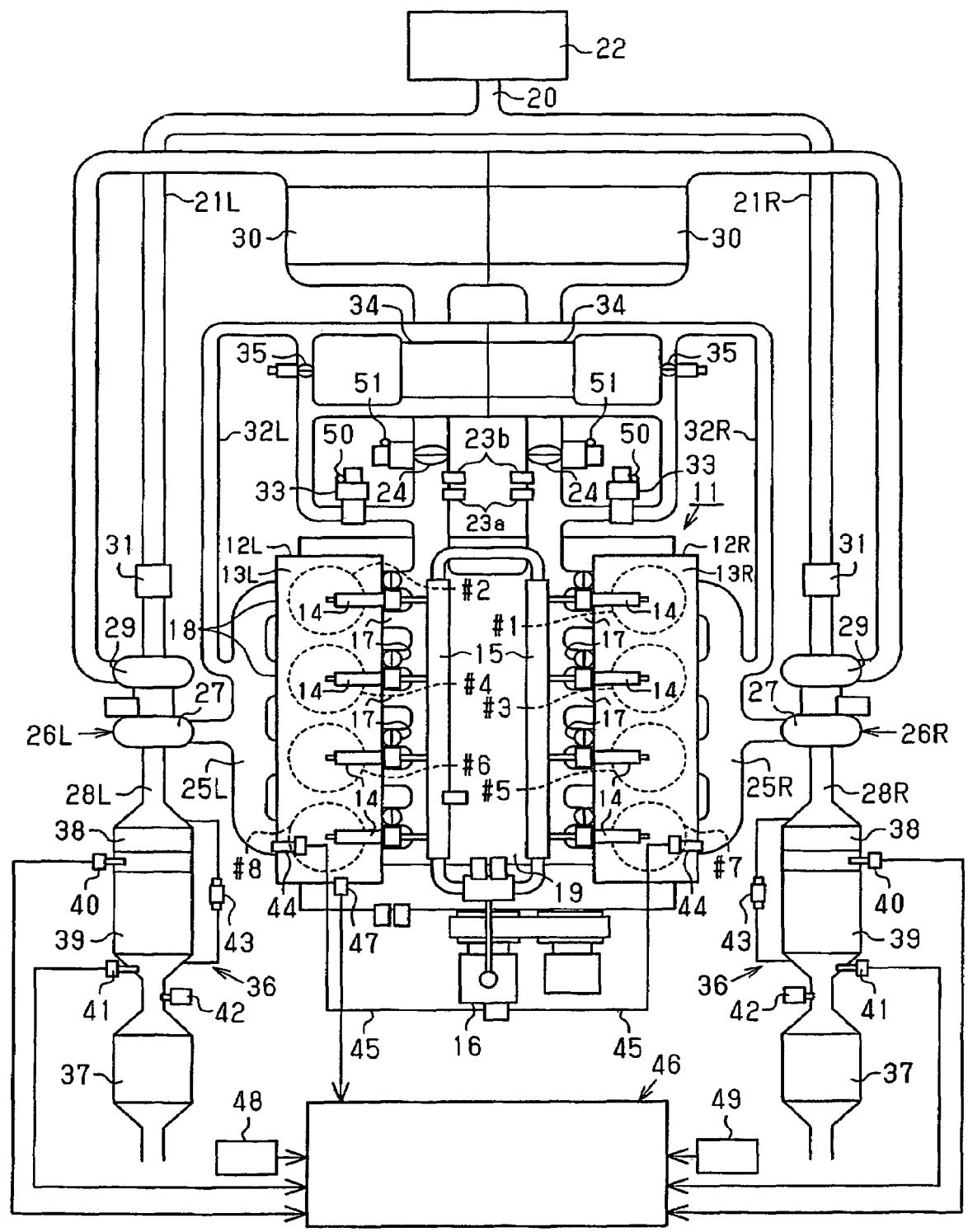
FIG. 1 is a schematic diagram of a diesel engine in which a fuel supply system according to a first embodiment of the present invention is installed, and a periphery thereof.

As shown in FIG. 1, an engine 11, which is an internal combustion engine, is provided with a plurality of (eight in the present embodiment) cylinders #1 to #8. The cylinders #1 to #8 are separated into two groups, and are arranged four by four in a right bank 12R and a left bank 12L forming a V shape. That is, the first cylinder #1, the third cylinder #3, the fifth cylinder #5 and the seventh cylinder #7 are arranged in the right bank 12R, and the second cylinder #2, the fourth cylinder #4, the sixth cylinder #6 and the eighth cylinder #8 are arranged in the left bank 12L. In other words, the engine 11 has a V-type 8-cylinder structure.

A fuel injection valve 14 is attached to each of the cylinders #2, #4, #6 and #8 in the left cylinder head 13L, and a fuel injection valve 14 is attached to each of the cylinders #1, #3, #5 and #7 in the right cylinder head 13R. The fuel injection valves 14 are connected to a common rail 15 accumulating a high pressure fuel, and a fuel is supplied to the common rail 15 from a supply pump 16. The high pressure fuel supplied to the common rail 15 is injected into the cylinders #1 to #8 from each fuel injection valve 14 at a time of opening each of the fuel injection valves 14.

The cylinder heads 13L and 13R are provided with an intake port 17 for introducing an ambient air into the cylinder, and an exhaust port 18 for discharging a burned gas out of the cylinder, in correspondence to each of the cylinders #1 to #8. A common intake manifold 19 connected to each of the intake ports 17 is connected to the cylinder heads 13L and 13R. The intake manifold 19 is connected to branch intake passages 21L and 21R branched from a main intake passage 20. In other words, an intake air supplied from the main intake passage 20 is again combined in a combining portion of the intake manifold 19 after being temporarily branched by the branch intake passages 21L and 21R, and is thereafter supplied to each of the cylinders #1 to #8. An air cleaner 22 is provided in an inlet of the main intake passage 20. Each of the branch intake passages 21L and 21R is provided with an intake pressure sensor 23a, intake temperature sensors 23b, and throttle valves 24 for regulating an intake air amount.

A left exhaust manifold 25L is connected to the left cylinder head 13L, and a right exhaust manifold 25R is connected to the right cylinder head 13R. The branch intake passage 21L is arranged in such a manner as to pass through a portion near an outlet of the left exhaust manifold 25L, and the outlet of the left exhaust manifold 25L is connected to an exhaust passage 28L via a turbine 27 of a supercharger 26L. The branch intake passage 21R is arranged in such a manner as to pass through a portion near an outlet of the right exhaust manifold 25R, and the outlet of the right exhaust manifold 25R is connected to an exhaust passage 28R via a turbine 27 of a supercharger 26R.

A compressor 29 of the supercharger 26L is provided in the middle of the branch intake passage 21L, and a compressor 29 of the supercharger 26R is provided in the middle of the branch intake passage 21R. The superchargers 26L and 26R are constituted by a known variable nozzle type turbocharger actuated by an exhaust stream. The movable type turbocharger has a turbine generating a rotation torque by being rotated by the exhaust stream, and a compressor pressure feeding the air by being actuated by the rotation torque as a driving source. An intercooler 30 is provided in a downstream portion than each of the superchargers 26L and 26R of the branch intake passages 21L and 21R. An air flowmeter 31 is provided in an upstream portion than the compressor 29 in each of the branch intake passages 21L and 21R.

The engine 11 is provided with an exhaust gas recirculation device, that is, an EGR device, and EGR passages 32L and 32R flowing back a part of the exhaust gas to the intake system are provided among the exhaust manifolds 25L, 25R and the intake manifold 19. An inlet of the left EGR passage 32L communicates with the left exhaust manifold 25L, and an outlet thereof communicates with the intake manifold 19 via an EGR valve 33. On the other hand, an inlet of the right EGR passage 32R communicates with the right exhaust manifold 25R, and an outlet thereof communicates with the intake manifold 19 via another EGR valve 33. It is possible to regulate an EGR gas supply amount from the exhaust system of the engine 11 to the intake system by regulating an opening degree of the EGR valves 33.

An inlet and an outlet of an EGR cooler 34 are respectively connected to the middles of each of the EGR passages 32L and 32R, and a bypass valve 35 is arranged in each of the EGR passages 32L and 32R between the inlet and the outlet. Further, if the bypass valves 35 are closed, the EGR gas in the corresponding one of the EGR passages 32L and 32R is cooled via the EGR coolers 34. On the contrary, if the bypass valves 35 are opened, the EGR gas bypasses the EGR coolers 34.

A first catalyst device 36 serving as an exhaust purifying catalyst device is provided in a downstream portion than the turbine 27 in each of the exhaust passages 28L and 28R, and a second catalyst device 37 serving as an oxidation catalyst device is provided in a downstream portion than the first catalyst device 36. A catalyst 38 for reducing NOx is accommodated in each first catalyst device 36. The catalysts 38 are NOx occlusion reducing type catalysts that occlude NOx in the exhaust gas at a time when an air-fuel ratio of the exhaust gas is lean, and reduces the occluded NOx so as to decompose the NOx at a time when the air-fuel ration becomes rich. Further, a filter 39 is accommodated within each first catalyst device 36, and a layer of the NOx occlusion reducing type catalyst is coated on a surface of the filter 39. The filter purifies a particulate matter (PM). An oxidation catalyst is accommodated in each second catalyst device 37, and the oxidation catalyst oxidizes, that is, purifies HC and CO. The first catalyst devices 36 and the second catalyst devices 37 constitute a so-called DPNR system, or diesel particulate NOx reduction system.

A first exhaust temperature sensor 40 is provided between each catalyst 38 and the corresponding filter 39. A second exhaust temperature sensor 41 is provided in a downstream portion than the filter 39 within each first catalyst device 36, and an air-fuel ratio sensor 42 is provided in an inlet of each second catalyst device 37. Each air-fuel ratio sensor 42 detects an air-fuel ratio of the exhaust gas on the basis of an exhaust component. The first exhaust temperature sensors 40 and the second exhaust temperature sensors 41 detect the exhaust temperature at respective positions. Piping of a differential pressure sensor 43 is provided in each of an upstream portion and a downstream portion than the filter 39 in each first catalyst device 36. The differential pressure sensor 43 detects a differential pressure between the upstream and downstream portions of each filter 39 for detecting a degree of clogging of the filter 39, that is, an accumulating degree of the particulate matter in the filter 39.

In the case of the diesel engine, the air-fuel ratio of the exhaust gas is normally lean. Accordingly, it is necessary to make the air-fuel ratio of the exhaust gas rich before the NOx occluding amount of each NOx occlusion reducing type catalyst 38 reaches a critical limit. Then, it is possible to make the air-fuel ratio of the exhaust gas rich by adding the fuel as the NOx reducing fuel to the exhaust gas from addition nozzles 44. In order that each catalyst 38 functions effectively, it is necessary to set the temperature of each catalyst 38 within a proper range. Accordingly, when the temperature of the first catalyst device 36 is within a previously set predetermined range, the fuel (the reducing fuel) is added to the exhaust gas from the addition nozzles 44, thereby discharging NOx from each catalyst 38 and reducing the NOx. An adding period and an adding interval of the reducing fuel is set on the basis of an operating state of the engine 11, the previous fuel adding amount or the like.

The addition nozzles 44 for supplying the reducing fuel to the catalysts 38 of the first catalyst devices 36 are attached to each of the cylinder heads 13L and 13R. The addition nozzle 44 attached to the left cylinder head 13L is provided in such a manner as to add the reducing fuel to the portion of the left exhaust manifold 25L corresponding to the exhaust port 18 of the eighth cylinder #8. The addition nozzle 44 attached to the right cylinder head 13R is provided in such a manner as to add the fuel to the portion of the right exhaust manifold 25R corresponding to the exhaust port 18 of the seventh cylinder #7. In the first to eighth cylinders #1 to #8, the seventh cylinder #7 and the eighth cylinder #8 are positioned at farthest from the inlets of the EGR passages 32L and 32R. The addition nozzles 44 are provided in the cylinder heads 13L and 13R in such a manner as to add the reducing fuel to the portions of the exhaust manifolds 25L and 25R corresponding to the exhaust ports 18 of the seventh cylinder #7 and the eighth cylinder #8 as mentioned above. Each addition nozzle 44 is connected to the supply pump 16 by a fuel supply pipe 45. A diesel oil corresponding to the fuel of the engine 11 is supplied as the reducing fuel to the addition nozzles 44. The addition nozzles 44 have the same structure as the fuel injection valves 14. The supply pump 16 and the fuel supply pipes 45 structure a fuel supply section supplying the fuel to the addition nozzles 44.

The engine 11 is controlled by an electronic control unit (ECU) 46. The ECU 46 is mainly constituted by a microcomputer provided with a central processing unit (CPU), a read only memory (ROM) previously storing various types of programs, maps and the like, a random access memory (RAM) temporarily storing calculation results of the CPU and the like, a timer counter, an input interface, an output interface and the like. The ECU 46 executes various types of controls of the engine 11, for example, a fuel injection amount of the fuel injection valves 14, a fuel adding period, a discharge pressure of the supply pump 16, a driving amount of an actuator opening and closing the throttle valves 24, an opening degree of each EGR valve 33 and the like. Further, the ECU 46 controls a fuel adding amount and a fuel adding timing of the addition nozzles 44. The ECU 46 functions as an addition control section controlling the addition nozzles 44 adding the reducing fuel for activating the catalysts 38.

The detected signals of the various types of sensors for detecting the operating state of the engine 11 are input to the ECU 46. The various types of sensors include the intake pressure sensors 23a, the intake temperature sensors 23b, the air flowmeters 31, the first exhaust temperature sensors 40, the second exhaust temperature sensors 41 and the air-fuel ratio sensors 42. Further, the various types of sensors include a water temperature sensor 47 detecting a water temperature of the engine 11, an accelerator pedal position sensor 48 detecting a pedaling amount of an accelerator pedal, a crank angle sensor 49 detecting a rotation speed of the engine 11 and a rotation angle of a crankshaft, EGR opening degree sensors 50 detecting an opening degree of the EGR valves 33, and throttle opening sensors 51 detecting an opening degree of the throttle valves 24. Further, the various types of sensor include a cylinder distinguishing sensor detecting a compression top dead center of a specific cylinder. In this case, an illustration of a part of an arrow indicating the detected signals of the various types of sensors and a command signal from the ECU 46 is omitted in FIG. 1 as a matter of convenience for illustration.

The memory installed in the ECU 46 stores maps and expressions used for determining the various types of command values (control values) to be commanded for controlling the engine 11, on the basis of the operating state of the engine 11 obtained from the various types of signals of the various types of sensors. The maps and the expressions include, for example, the maps and the expressions for determining the fuel adding timing and the fuel adding amount from the addition nozzles 44. Further, the memory stores the program for controlling the fuel addition by the addition nozzles 44.

The order of the compressive combustion of the first to eighth cylinders #1 to #8 in the V-8 type engine 11 is not set to an order of the right and left banks but is set to an order of the cylinder #1, the cylinder #2, the cylinder #7, the cylinder #3, the cylinder #4, the cylinder #5, the cylinder #6 and the cylinder #8. It is characteristic that the order of the seventh cylinder #7 exists between the second cylinder #2 and the third cylinder #3. The intake stroke, the compression stroke, the expansion stroke and the exhaust stroke of the first cylinder #1, the seventh cylinder #7, the third cylinder #3 and the fifth cylinder #5 in the right bank 12R are executed in accordance with the order shown in FIG. 2A. Further, the intake stroke, the compression stroke, the expansion stroke and the exhaust stroke of the second cylinder #2, the fourth cylinder #4, the sixth cylinder #6 and the eighth cylinder #8 in the left bank 12L are executed in accordance with the order shown in FIG. 2B.

As is apparent from FIG. 2A, there exists a non-exhaust period in which the exhaust gas does not flow out to the right exhaust passage 28R from an inner side of the right exhaust manifold 25R. That is, there exists the period in which none of the second cylinder #2, the fourth cylinder #4, the sixth cylinder #6 and the eighth cylinder #8 comes to the exhaust stroke. Further, as is apparent from FIG. 2B, there exists a non-exhaust period in which the exhaust gas does not flow out to the left exhaust passage 28L from an inner side of the left exhaust manifold 25L. That is, there exists the period in which none of the first cylinder #1, the seventh cylinder #7, the third cylinder #3 and the fifth cylinder #5 comes to the exhaust stroke. If the fuel is added from the addition nozzles 44 during the non-exhaust period, the fuel added within the exhaust manifolds 25L and 25R tend to be attached to the wall surfaces of the exhaust manifolds 25L and 25R corresponding to the wall surfaces of the exhaust system.

Accordingly, the ECU 46 controls one of the addition nozzles 44 in such a manner as to add the fuel to the left exhaust manifold 25L from the addition nozzle 44 during the period except the non-exhaust period of the cylinder corresponding to the left exhaust manifold 25L, that is, during the period in which at least one of the second cylinder #2, the fourth cylinder #4, the sixth cylinder #6 and the eighth cylinder #8 is in the exhaust stroke. Further, the ECU 46 controls the other addition nozzle 44 in such a manner as to add the fuel to the right exhaust manifold 25R from the addition nozzle 44 during the period except the non-exhaust period of the cylinder corresponding to the right exhaust manifold 25R, that is, during the period in which at least one of the first cylinder #1, the seventh cylinder #7, the third cylinder #3 and the fifth cylinder #5 is in the exhaust stroke. That is, the ECU 46 controls the addition nozzles 44 in such a manner as to add the fuel from the addition nozzles 44 during the period except the non-exhaust period of the cylinder corresponding to the exhaust manifolds 25L and 25R provided with the addition nozzles 44.

In the present embodiment, a part of the fuel of the engine 11 is used as the fuel for activating the catalysts 38. Accordingly, the pressure of the fuel supplied to the addition nozzles 44 is changed in correspondence to the rotating speed of the engine 11. Therefore, if the fuel is added from the nozzles 44 at a high speed at a time when the rotating speed of the engine 11 is low, the added fuel tends to be attached to the wall surfaces of the exhaust manifolds 25L and 25R. However, since the present embodiment is structured such that the fuel pressure is changed in accordance with the rotating speed of the engine 11 as mentioned above, the pressure of the fuel supplied to the addition nozzles 44 is low in the case that the rotating speed of the engine 11 is low. Accordingly, it is possible to avoid a situation that the fuel added from the addition nozzles 44 is attached to the wall of the exhaust system.

Figure 3A:
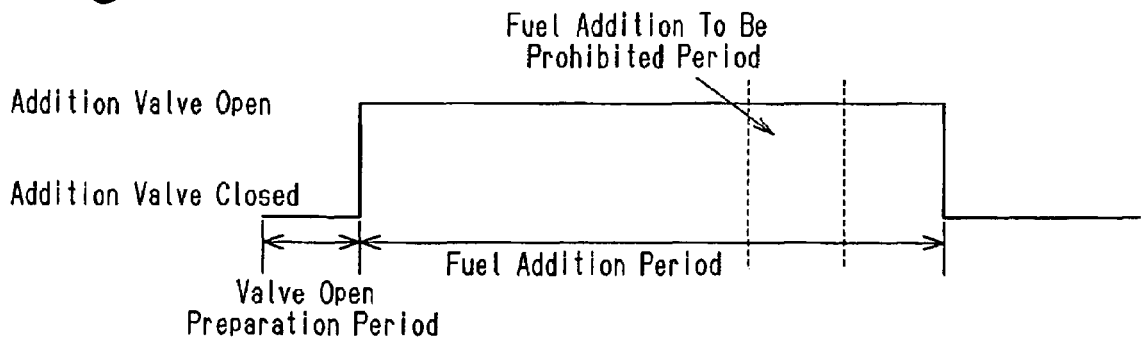
FIG. 3A is a time chart showing a valve opening period of an addition nozzle in the case that a fuel adding period of the addition nozzle is not divided in the left bank of the engine in FIG. 1.

Further, the period during which the fuel can be added from the addition nozzles 44 is preferably made longer so that it is possible to securely add the fuel from the addition nozzles 44 at an amount to be supplied during one cycle of the engine 11. However, if the fuel adding period is set to the continuous 540 degrees crank angle in the same manner as the conventional 4-cylinder engine, in the present embodiment in which the engine 11 is constituted by the V-type 8-cylinder engine, the state including the non-exhaust period is formed within the fuel addition period, as shown in FIG. 3A. One of countermeasure for avoiding this situation, the fuel adding period during one cycle is limited only to before or after the non-exhaust period by limiting the fuel addition period to one time during one cycle of the engine 11. In this case, it is hard to secure the period during which the fuel can be added in the same level as the conventional 4-cylinder engine, that is, during the continuous 540 degrees crank angle.

Figure 3B:
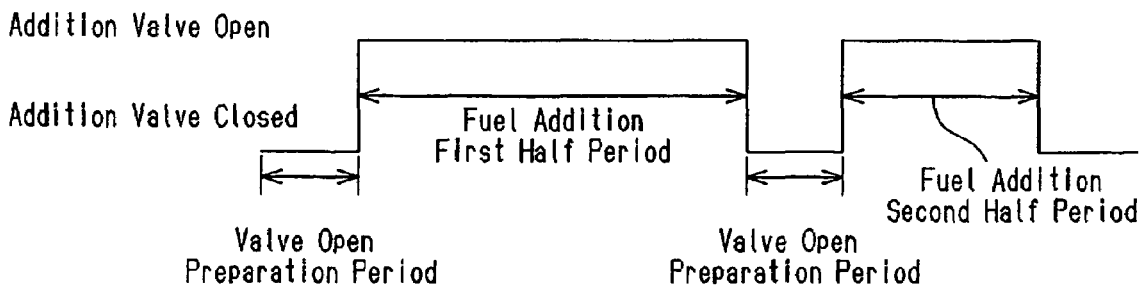
FIG. 3B is a time chart showing a valve opening period in the case that the fuel adding period of the addition nozzle is divided in the left bank, in comparison with FIG. 3A.

Accordingly, in the present embodiment, the fuel adding period during one cycle of the engine 11 is not limited to one time, but is divided into two portions in such a manner that the fuel adding period exists before and after the non-exhaust period, as shown in FIG. 3B. That is, the portion corresponding to the non-exhaust period in the fuel addition period is added after the non-exhaust period. The period of one cycle of the engine 11 corresponds to the period in which one cylinder, for example, the first cylinder #1 executes the intake stroke, the compression stroke, the expansion stroke and the exhaust stroke, and corresponds to the crank angle of 720 degrees.

In the present embodiment, as shown in FIG. 2A, a start time of the fuel adding period of a first half (front half) in the right bank 12R is set to a start time of the exhaust stroke of the seventh cylinder #7, and an end time is set to a start time of the compression stroke of the third cylinder #3. A start time of the fuel adding period of a second half (rear half) is set to a start time of the exhaust stroke of the first cylinder #1, and an end time is set to a start time of the compression stroke of the fifth cylinder #5. In other words, the fuel adding period of the first half portion corresponds to the period of the 450 degrees crank angle to the maximum, and the fuel adding period of the second half portion corresponds to the period of the 90 degrees crank angle to the maximum. That is, it becomes the totally 540 degrees crank angle period.

Further, as shown in FIG. 2B, a start time of the fuel adding period of a first half in the left bank 12L is set to a start time of the exhaust stroke of the eighth cylinder #8, and an end time is set to a start time of the compression stroke of the eighth cylinder #8. A start time of the fuel adding period of a second half is set to a start time of the exhaust stroke of the fourth cylinder #4, and an end time is set to a start time of the exhaust stroke of the sixth cylinder #6. In other words, the fuel adding period of the first half portion corresponds to the period of the 360 degrees crank angle to the maximum, and the fuel adding period of the second half portion corresponds to the period of the 180 degrees crank angle to the maximum. That is, it becomes the totally 540 degrees crank angle period.

Figure 4:
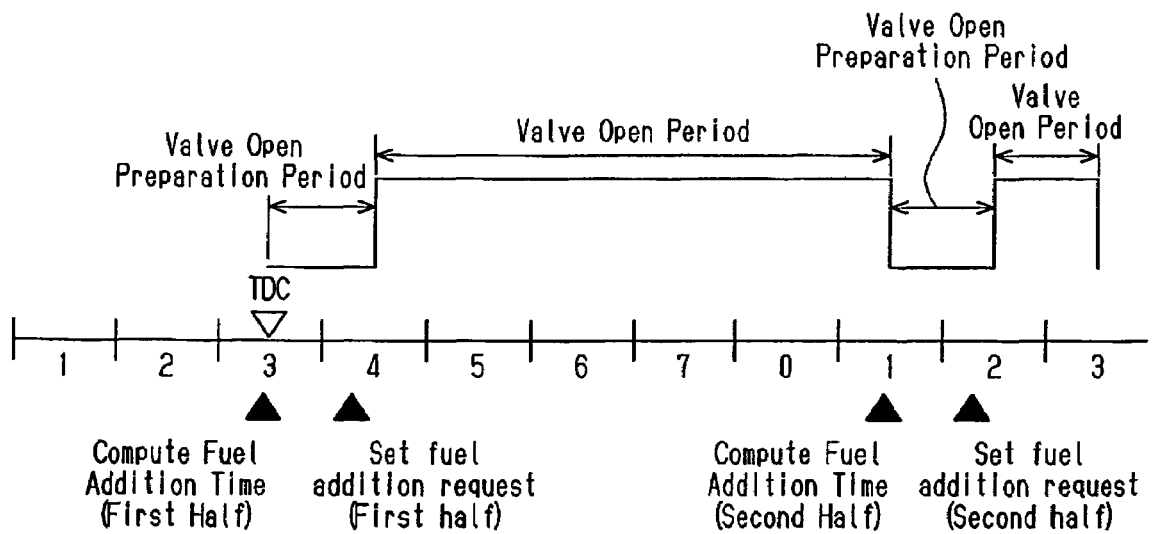
FIG. 4 is a time chart showing a control example in the case that the fuel is divided and added from the addition nozzle, in the right bank corresponding to FIG. 2A.
Figure 5:
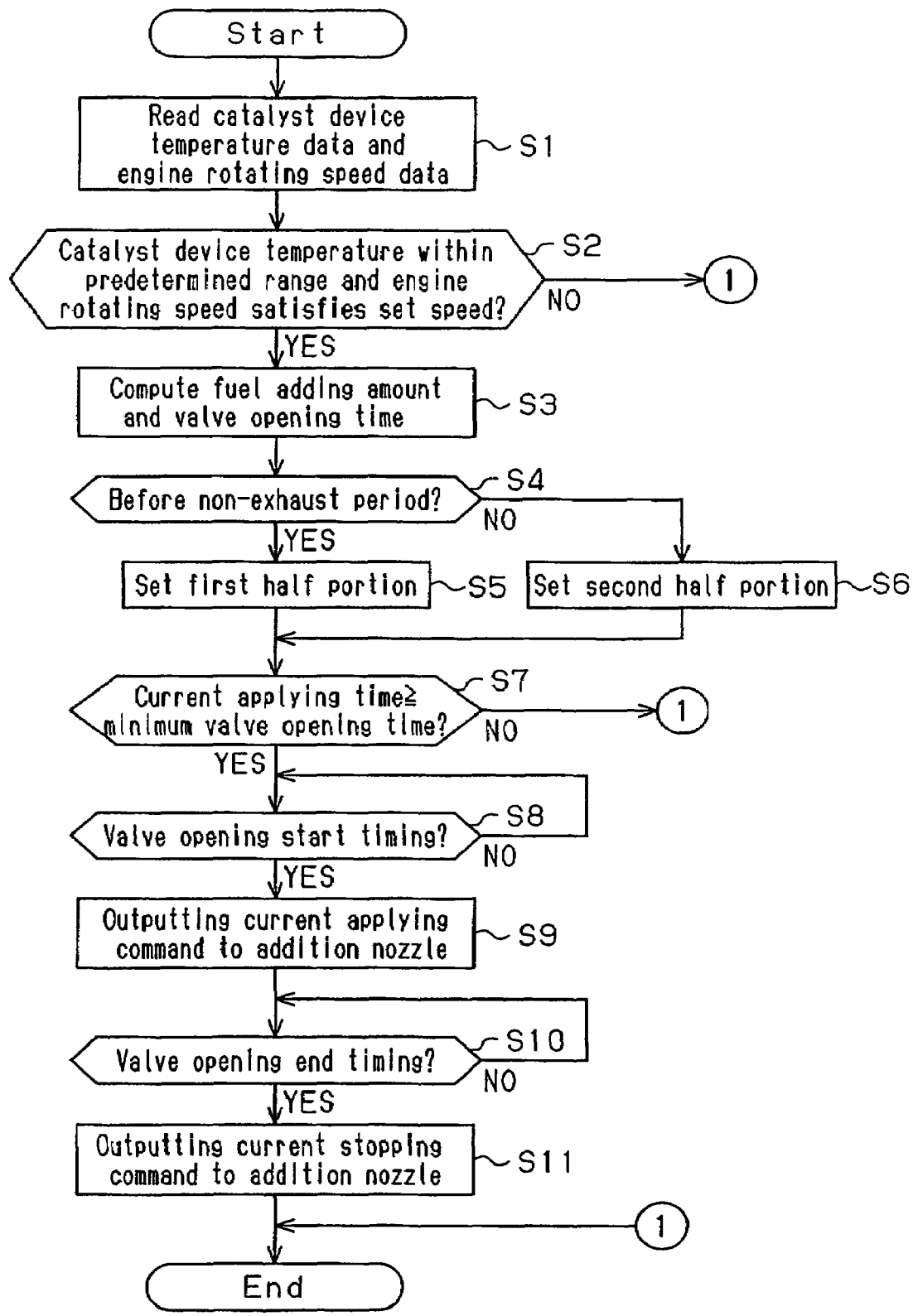
FIG. 5 is a flowchart showing a procedure of a fuel adding control by the fuel supply system in FIG. 1.

Further, the ECU 46 computes the fuel adding amount necessary for one cycle of the engine 11 and the fuel adding period necessary for the adding amount per each of the cycles. Further, the ECU 46 individually sets and computes the valve opening period of each addition nozzle 44, that is, a current applying time to the addition nozzle 44, in both of the fuel adding periods in the first half portion and the second half portion with respect to the non-exhaust period. Accordingly, as shown in FIG. 4, in the other periods than the non-exhaust period, the ECU 46 requires the period for setting and computing the current applying time to each addition nozzle 44. That is, the period in which the fuel is not added from the addition nozzle 44 exists in the other period than the non-exhaust period. The period mentioned above is comprehended as a preparation period for opening the addition nozzle 44.

The ECU 46 allocates the valve opening time of each addition nozzle 44 to the first half by priority in such a manner that the fuel is added from the addition nozzle 44 by priority in the first half period with respect to the non-exhaust period. That is, the first half period is set longer than the second half period. The ECU 46 sets the second half valve opening time, that is, the current applying time to each addition nozzle 44 in such a manner that the remaining amount is added in the second half in the case the fuel cannot be added at the necessary amount for one cycle only by adding the fuel in the first half.

In order to recover the capacity of the NOx reduction catalysts 38, not only the fuel is simply supplied to the catalysts 38, but also it is necessary that the fuel at such an amount that the air-fuel ratio becomes in a rich state for a short time is supplied, such as a so-called rich spike. The shortest valve opening time of each addition nozzle 44 is set to a time for which it is possible to add the fuel at an amount greater tan or equal to an amount achieving the rich spike. In the case that the fuel at the amount which cannot be supplied in the first half is carried over and the case that the carry-over amount is less than the amount corresponding to the shortest valve opening time, the ECU 46 does not add the fuel in the second half, but adds the fuel at the carry-over amount to the fuel addition amount in the first half in the next cycle (adding time), and sets the next valve opening time (current applying time) of the addition nozzles 44.

In the case the fuel amount expected to be added in the first and second halves total fuel adding period is less than the fuel adding amount necessary for one cycle, if the carry-over amount from the first half to the second half exists, the carry-over amount is not further carried over to next time but is added in this time second half.

Next, a description will be given of an operation of the apparatus structured mentioned above.

The ECU 46 comprehends the operating state of the engine 11 from the detected signals of the air flowmeters 31, the water temperature sensor 47, the accelerator pedal position sensor 48, the crank angle sensor 49 and the like. Further, the ECU 46 computes a fuel injection amount from each fuel injection valve 14, a fuel injection timing and an exhaust circulating flow rate passing through the EGR passages 32L and 32R, in such a manner as to form the comprehended operating state of the engine 11, that is, a proper combustion state corresponding to a load state, and controls the supply pump 16, the fuel injection valves 14 and the EGR valves 33.

Further, the ECU 46 controls the addition nozzles 44 in such a manner that the catalysts 38 execute the reducing process of the NOx occluded in the catalysts 38 in a state in which the temperature of the first catalyst devices 36 exists in the proper temperature range achieving the activating operation. The ECU 46 controls the addition nozzles 44 in accordance with a flowchart in FIG. 5 in the case of executing the reducing process of the NOx.

The ECU 46 reads the temperature within the first catalyst devices 36 and the rotating speed of the engine 11, that is, the detected signals of the first exhaust temperature sensors 40, the second exhaust temperature sensors 41 and the crank angle sensor 49 in a step S1. Next, the ECU 46 judges in a step S2 whether the rotating speed of the engine 11 satisfies a set speed necessary for adding the fuel from the addition nozzles 44, and whether the temperature within the first catalyst devices 36 is within a predetermine range for adding the fuel from the addition nozzles 44. If the ECU 46 judges in the step S2 that the temperature of the first catalyst devices 36 does not satisfy the predetermined condition, the ECU 46 finishes the subsequent process, and if the predetermined condition is satisfied, the step goes to a step S3.

The ECU 46 computes the fuel adding amount necessary for one cycle of the engine 11 and the valve opening time (the current applying time) of the addition nozzles 44 corresponding to the adding amount before and after the non-exhaust period, in the step S3. At this time, if the carry-over amount of the fuel from one before cycle exists, the ECU 46 adds the carry-over amount to the fuel adding amount in the case that the carry-over amount does not exist so as to comprehend as the fuel adding amount necessary for one cycle and set the valve opening time.

Next, the ECU 46 goes to a step S4, and judges on the basis of an output signal of the crank angle sensor 49 in the step S4 whether this time fuel adding time is before or after the non-exhaust period. Further, if this time fuel adding time is before, that is, the first half portion, the ECU 46 goes to a step S5, sets the current applying time corresponding to the first half portion in the step S5, and thereafter goes to a step S7. If it is not the first half portion, the ECU 46 goes to a step S6, sets the current applying time corresponding to the rear half portion in the step S6, and thereafter goes to the step S7. The ECU 46 judges in the step S7 whether the current applying time is greater than or equal to the minimum valve opening time. If the current applying time is less than the minimum valve opening time, the ECU 46 finishes the process, and if the current applying time is greater than or equal to the minimum valve opening time, the ECU 46 goes to a step S8.

The ECU 46 judges on the basis of the output signal of the crank angle sensor 49 in the step S8 whether the present time is the valve opening start timing. If it is not, the ECU 46 stands ready until the valve opening start timing. Further, if it becomes the valve opening timing, the ECU 46 goes to a step S9, and goes to a step S10 after outputting the current applying command to the addition nozzles 44 in the step S9. The ECU 46 judges on the basis of the output signal of the crank angle sensor 49 in the step S10 whether the present time is the valve opening end timing. If it is not, the ECU 46 stands ready until the valve opening end timing. Further, if it becomes the valve opening end timing, the ECU 46 goes to a step S11, and finishes the process after outputting the current application end command to the addition nozzles 44 in the step S11.

Further, in the case of detecting on the basis of the detected signal of the differential pressure sensors 43 that the differential pressure between the inlet and the outlet of the first catalyst devices 36 becomes equal to or less than the previously set predetermined pressure, as a result that the PM is accumulated in the catalysts 38 of the first catalyst devices 36 and the filters 39, the ECU 46 executes a PM removing process in preference to a NOx reducing process. The PM removing process is executed by adding the fuel to the exhaust gas under a high temperature and lean condition.

Further, the catalyst performance of the catalysts 38 is deteriorated due to a sulfur poisoning caused by occluding a sulfur component in the fuel. Accordingly, it is necessary to execute a poisoning release process under a higher temperature rich condition than the condition of the NOx reduction. A frequency of the poisoning release process is less than the PM removing process. The ECU 46 executes the poisoning release process between the PM removing process and the NOx reducing process.

The present embodiment has the following advantages.

(1) The engine 11 is provided with the first catalyst devices 36 in the middle f the exhaust passages 28L and 28R to which the exhaust manifolds 25L and 25R are connected. The addition nozzles 44 adding and supplying the fuel for activating the catalysts 38 of the first catalyst devices 36 are controlled by the addition control section (the ECU 46). The ECU 46 controls the addition nozzles 44 during the operation of the engine 11 in such a manner as to add the fuel from the addition nozzles 44 in the period except the non-exhaust period in which the exhaust gas does not flow out to the exhaust passages 28L and 28R from the inner sides of the exhaust manifolds 25L and 25R. Accordingly, it is possible to avoid the situation that the fuel of the first catalyst devices 36 added to the exhaust manifolds 25L and 25R collects on the wall surface of the exhaust system without getting on the exhaust stream.

(2) The ECU 46 controls the addition nozzles 44 in such a manner that the fuel is added in both of the periods before and after the non-exhaust period, by dividing the period for adding the fuel from the addition nozzles 44 into two periods in such a manner as to exist before and after the non-exhaust period. Accordingly, summing both the periods, it is possible to secure the same level of fuel adding period as the four-cylinder engine. As a result, it is easy to secure the necessary fuel adding amount while avoiding the situation that the fuel is added in such a high pressure that the fuel added from the addition nozzles 44 collects on the wall of the exhaust system.

(3) The fuel adding period is divided into two periods so as to exist before and after the non-exhaust period. In the case that the fuel amount expected to be added in the second half with respect to the non-exhaust period is less than the amount of the proper atmosphere for the NOx reduction, that is, the amount achieving the rich spike, the ECU 46 controls the addition nozzles 44 in such a manner as to carry over the fuel at the amount expected to be added in the second half to the next fuel adding timing so as to inject. The pressure of the fuel supplied to the addition nozzles 44 is changed on the basis of the rotating speed of the engine 11. Accordingly, there is generated the case that the fuel amount added in the second half with respect to the non-exhaust period does not satisfy the amount necessary for achieving the proper atmosphere for reducing the NOx of the catalysts 38, in some rotating speed of the engine 11. In this case, the fuel is not added from the addition nozzles 44. In such a case, in the present embodiment, the fuel at the amount which is not added in the second half is carried over to the next fuel adding timing. Accordingly, the portion which is not activated in this time in the catalysts 38 is activated in the next time.

(4) The addition nozzles 44 are provided in such a manner as to add the fuel to the position corresponding to the exhaust port 18 of the seventh cylinder #7 and the exhaust port 18 of the eighth cylinder #8. The addition nozzles 44 are controlled in such a manner as to start the fuel addition in synchronous with the exhausting of the corresponding cylinder (the seventh cylinder #7 and the eighth cylinder #8 in the present embodiment). Accordingly, the fuel is hard to collect on the wall surface of the exhaust system, that is, the wall surface of the exhaust manifolds 25L and 25R.

(5) The addition nozzles 44 provided in the cylinder heads 13L and 13R are arranged in such a manner as to add the fuel to the positions corresponding to the exhaust ports 18 of the seventh cylinder #7 and the eighth cylinder #8 which are farthest from the inlets of the EGR passages 32L and 32R in the first to eighth cylinders #1 to #8. Accordingly, it is possible to prevent the fuel added from the addition nozzles 44 from entering into the EGR passages 32L and 32R.

(6) The addition nozzles 44 are controlled in the same manner between the first half and the second half so as to exist before and after the non-exhaust period. Accordingly, the control program becomes simple.

Next, a description will be given of a second embodiment in accordance with the present invention with reference to FIG. 6. The present embodiment is greatly different from the first embodiment in the following point. That is, the fuel supply section supplying the fuel to the addition nozzles 44 is structured such as to freely change the pressure of the fuel supplied to the addition nozzles 44 greater than or equal to the pressure of the fuel supplied to the engine 11.

Further, in the case that the pressure of the fuel supplied to the addition nozzles 44 is set to be equal to the pressure of the fuel supplied to the engine 11, the addition control section (the ECU 46) judges whether the fuel at the amount to be supplied during one cycle of the engine 11 can be added from the addition nozzles 44 within the fuel adding period. Further, in the case of judging "not", the ECU 46 controls in such a manner as to increase the pressure of the fuel supplied to the addition nozzles 44. The other structures of the second embodiment are the same as those of the first embodiment, and a detailed description of the same portions as the first embodiment will be omitted by attaching the same reference numerals.

Figure 6:
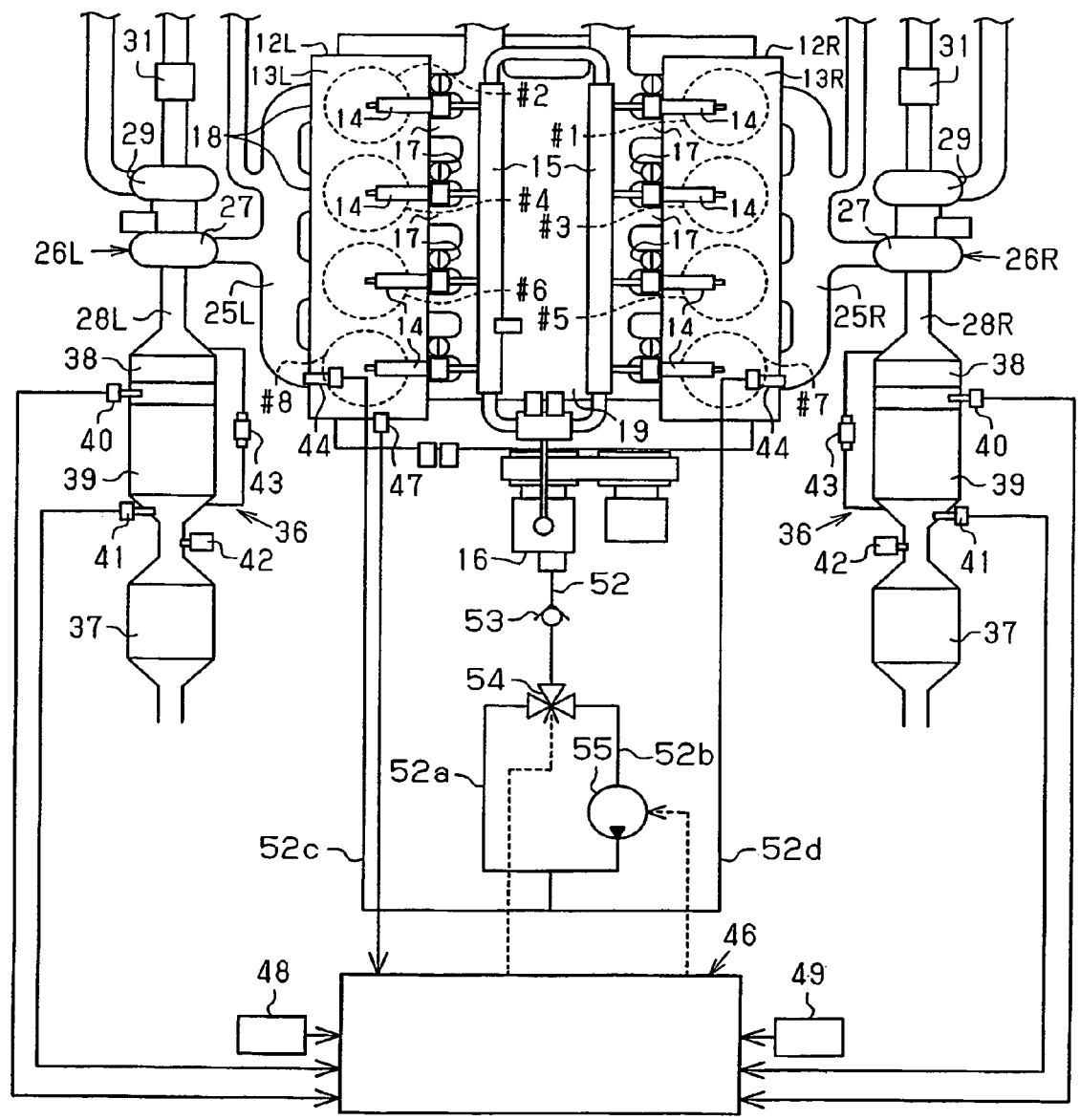
FIG. 6 is a schematic diagram showing a fuel supply section in a second embodiment of the present invention.

As shown in FIG. 6, a fuel supply pipe 52 is connected to the supply pump 16 via a check valve 53. An electromagnetic three-way valve 54 is provided in a downstream portion from the check valve 53 of the fuel supply pipe 52. A pump 55 is provided in one branch pipe, that is, a second branch pipe 52b of two branch pipes, that is, first and second branch pipes 52a and 52b extending from the electromagnetic three-way valve 54. The first and second branch pipes 52a and 52b are again combined in a downstream side from the pump 55. The fuel supply pipe 52 is again branched into branch pipes 52C and 52D in a downstream side from the combined portion of the first and second branch pipes 52a and 52b, and each of these branch pipes 52C and 52D is coupled to one of the nozzles 44. The electromagnetic three-way valve 54 is controlled so as to be switched to a state in which the fuel flows into the first branch pipe 52a after passing through the check valve 53 and a state in which the fuel flows into the second branch pipe 52b, on the basis of a command signal from the ECU 46. The pump 55 is driven on the basis of the command signal from the ECU 46. If the pump 55 is driven, the pressure of the fuel within the fuel supply pipe 52 becomes higher than the pressure of the fuel supplied to the engine 11. In other words, the fuel supply section of the present embodiment is provided with the supply pump 16 and the fuel supply pipes 45 (the fuel supply pipe 52) constituting the fuel supply section of the embodiment in the fuel supply pipe 52, and is provided further with the check valve 53, the electromagnetic three-way valve 54 and the pump 55. Accordingly, the fuel supply section of the second embodiment is structured such as to be capable of changing the pressure of the fuel supplied to the addition nozzles 44 independent from the pressure of the fuel supplied to the engine 11.

The electromagnetic three-way valve 54 is switched in such a manner that the fuel normally flows through the first branch pipe 52a. However, in the case that the pump 55 is driven, the electromagnetic three-way valve 54 is switched in such a manner that the fuel flows through the second branch pipe 52b. The ECU 46 executes the NOx reducing process in accordance with the flowchart in FIG. 5 in the other steps S1, S2 and S4 to S11 than the process in the step S3 in the flowchart of FIG. 5, that is, the computation process of the fuel adding amount and the valve opening time (the current applying time) of the addition nozzles 44. The ECU 46 first computes the valve opening time on the assumption that the pressure of the adding fuel is set to the same pressure of the fuel supplied from the supply pump 16, as the computation process of the fuel adding amount and the valve opening time in place of the process in the step S3. Further, the ECU 46 judges whether the fuel can be added within the computed valve opening time. If the result of judgment is "yes", the ECU 46 sets the computed valve opening time as it is, and if it is "no", the ECU 46 increases the pressure of the added fuel so as to recompute the valve opening time, and sets the valve opening time. In order to increase the pressure of the added fuel, the ECU 46 switches the electromagnetic three-way valve 54 in such a manner that the fuel flows through the second branch pipe 52b, and outputs the drive command to the pump 55. In this case, the pressure of the fuel is set so as to be less than a pressure value by which the fuel added from the addition nozzles 44 tends to be attached to the wall surfaces of the exhaust manifolds 25L and 25R.

Accordingly, in accordance with the second embodiment, in addition to the same advantages as the advantages (1), (2) and (4) to (6) of the first embodiment, the following advantages are obtained.

(7) The fuel supply section is structured to be capable of changing the pressure of the fuel supplied to the addition nozzles 44 greater than or equal to the pressure of the fuel supplied to the engine 11. On the assumption that the pressure of the fuel supplied to the addition nozzles 44 is equal to the pressure of the fuel supplied to the engine 11, the ECU 46 judges whether the fuel at the amount to be supplied during one cycle of the engine 11 can be added from the addition nozzles 44 within the fuel adding period. In the case that the result of judgment is "no", the ECU 46 controls in such a manner as to increase the pressure at which the fuel supply section supplies the fuel. Accordingly, even in the case that the pressure of the fuel supplied to the engine 11 is low, the fuel supply pressure by the fuel supply section can be increased. As a result, it is possible to add the predetermined amount of fuel within the fuel adding period.

(8) The fuel supply section for the addition nozzles 44 is not structured to be completely independent from the fuel supply system for the engine 11. That is, the fuel supply section normally supplies the fuel to the addition nozzles 44 at the supply pressure of the supply pump 16 supplying the fuel to the engine 11. Further, the fuel supply section is structured such as to drive the pump 55 at a necessary time so as to increase the pressure of the fuel supplied to the addition nozzles 44. Accordingly, the structure of the apparatus of the present embodiment is simplified in comparison with the structure in which the fuel supply section for the addition nozzles 44 is completely independent from the fuel supply system for the engine 11.

It should be apparent to those skilled in the art that the present invention may be embodied in many other specific forms without departing from the spirit or scope of the invention. Particularly, it should be understood that the invention may be embodied in the following forms.

It is preferable that the fuel adding period of the addition nozzles 44 is constituted by the period except the non-exhaust period. For example, there is no need to synchronize the timing for starting the addition of the reduction fuel with the start timing of the exhaust stroke of the cylinder corresponding to the addition nozzles 44, the exhaust stroke start timing of the seventh cylinder #7 and the eighth cylinder #8 in the embodiment mentioned above. In the embodiment mentioned above, in order to synchronize the addition start timing of the reduction fuel from the addition nozzles 44 with the exhaust stroke start timing of one of the seventh cylinder #7 and the eighth cylinder #8, the fuel adding periods in the left bank 12L and the right bank 12R are divided so as to have the different lengths from each other. However, the adding periods of the reduction fuel in both the left and right banks 12L and 12R may be set so as to be in the same divided states with each other. For example, the period for starting the addition of the reduction fuel in the left bank 12L may be set such that the fuel adding period of the first half portion in the left bank 12L is in the 450 degrees crank angle in the same manner as the right bank 12R. In this case, it is possible to execute the fuel adding control in the same manner in both the left and right addition nozzles 44. Accordingly, for example, the control of the addition nozzles 44 are easily executed in comparison with the case that the fuel adding periods are different between both the right and left addition nozzles 44.

The fuel adding period of the addition nozzles 44 is not limited to be set such that the first half becomes longer with respect to the non-exhaust period, but may be set such that the first half and the second half have the same length or the second half is longer.

The setting of the valve opening time of the addition nozzles 44 is not limited to the computation per the respective addition start timings of the first half and the second half with respect to the non-exhaust period. For example, the valve opening time in the second half may be set during the process of the first half. That is, there is no need that the second half addition start timing is set on the basis of the detected angle of the crank angle sensor 49. For example, the first half addition start timing is set on the basis of the detected angle of the crank angle sensor 49. In this case, the second half addition start timing may be set by a timer starting a count on the basis of the first half start timing.

The attached positions of the addition nozzles 44 are not limited to the positions corresponding to the seventh cylinder #7 and the eighth cylinder #8. The attached positions of the addition nozzles 44 may be determined in such a manner that the fuel adding positions from the addition nozzles 44 come to positions away from the inlets of the EGR passages 32L and 32R. Further, there is no need that the attached positions of the addition nozzles 44 are symmetrical between both the left and right banks 12L and 12R.

In the embodiment mentioned above, the ECU 46 controls the addition nozzles 44 in such a manner that the addition nozzles 44 execute the fuel injection, in the state in which the temperature of the first catalyst devices 36 is within the proper temperature range that the catalysts 38 provide the activating operation. However, the structure is not limited to this, but it is possible to control such that the fuel injection is not executed from the addition nozzles 44 until the NOx is occluded in the catalysts 38 at the amount greater than or equal to the predetermined amount, even if the temperature of the first catalyst devices 36 exists within the proper temperature range. For example, the ECU 46 estimates the NOx occluding amount of the catalysts 38 on the basis of the operating state of the engine 11, an elapsed time from the proximate NOx reduction or the like. Further, in the case that the estimated amount of the NOx occlusion in the catalysts 38 is less than the predetermined amount, the ECU 46 controls the addition nozzles 44 in such a manner as not to execute the fuel injection from the addition nozzles 44 even if the temperature of the first catalyst devices 36 is within the proper temperature range. In this case, the ECU 46 controls in such a manner as to execute the fuel injection from the addition nozzles 44 in the case that the estimated amount and the temperature of the first catalyst devices 36 satisfy the predetermined condition.

The structure may be made such that the exhaust process is executed only by the first catalyst devices 36 by omitting the second catalyst devices 37.

In the embodiment mentioned above, the PM removing filters 39 are provided in the first catalyst devices 36. That is, the structure is made such that the first catalyst devices 36 execute both of the NOx reducing process and the PM removing process. In place of this, the structure may be made such that the first catalyst devices 36 are set for the NOx reducing process exclusive use, and the other filter apparatus is provided for the PM removing process.

In the embodiment mentioned above, in order to judge whether the temperature of the first catalyst devices 36 exists within the proper temperature range for executing the NOx reduction of the catalysts 38, the temperature of the first catalyst devices 36 is directly detected by the first exhaust temperature sensors 40 and the second exhaust temperature sensors 41. In place of this, the exhaust temperature sensor may be provided in the other position than the first catalyst devices 36. For example, the exhaust temperature sensor may be provided in the exhaust manifolds 25L and 25R, or may be provided in the upstream portion than the first catalyst devices 36 of the exhaust passages 28L and 28R. Further, the temperature of the exhaust gas may be estimated by utilizing parameters indicating the rotating speed of the engine 11 and the operating state of the engine 11 without detecting the temperature of the exhaust gas by the sensor. As the parameter, there are, for example, an accelerator pedal position, an opening degree of the throttle valves 24, an opening degree of the EGR valves 33, an oxygen concentration in the exhaust gas, and the like.

The internal combustion engine to which the present invention is applied is not limited to the V-type 8-cylinder engine 11. The present invention may be applied to the other engines than the V-type 8-cylinder engine as far as the engine has the non-exhaust period in which the exhaust gas does not flow out to the exhaust passage from the exhaust manifold during the operation of the engine.

Further, the internal combustion engine to which the present invention is applied is not limited to the diesel engine, but may be applied to a gasoline engine. Further, the present invention may be applied to a fixed type engine such as an engine for a power generating apparatus without being limited to the engine for the motor vehicle.

In the embodiment mentioned above, the second half fuel addition is canceled in the case that the fuel is less than the fuel adding amount forming the rich spike. In place of this, for example, the second half injection may be canceled in the case that a required injection time is shorter than a practicable minimum injection time for the fuel injection performance of the addition nozzles 44. The minimum injection time corresponds to a time determined for the reason why the fuel is not actually injected from the addition nozzles 44 even if the addition nozzles 44 are opened in the case that the injection time is too short.

What is claimed is:

1. A fuel supply system for an exhaust purifying catalyst device in an internal combustion engine, the engine including:
   a plurality of cylinders each having an exhaust port;
   at least one exhaust manifold, each exhaust manifold being connected to the exhaust ports of the cylinders;
   an exhaust passage connected to the exhaust manifold; and
   a catalyst device having a catalyst provided in the middle of the exhaust passage,
   wherein in the exhaust manifold, there exists a non-exhaust period in which none of the cylinders corresponding to the exhaust manifold is in an exhaust stroke, whereby exhaust gas does not flow out to the exhaust passage from the exhaust manifold when the engine is in operation, and
   wherein the fuel supply system comprises:
   an addition nozzle injecting a fuel to the exhaust manifold for activating the catalyst; and
   a control section controlling the addition nozzle so as to add the fuel to the exhaust manifold in a period other than the non-exhaust period,
   wherein the control section sets a fuel adding period of the addition nozzle so as to divide the fuel adding period into a first half portion and a second half portion so that the period exits before and after the non-exhaust period, and controls the addition nozzle in such a manner as to add the fuel in the first half portion and the second half portion.

2. The fuel supply system according to claim 1, wherein in the case that an amount of the fuel expected to be added in the second half portion is less than a necessary amount for achieving an appropriate atmosphere for a NOx reduction of the catalyst, the control section controls the addition nozzle in such a manner as to add the fuel at an amount expected to be added in the second half portion in the next fuel adding period without adding the fuel from the addition nozzle in the second half portion.

3. The fuel supply system according to claim 1, wherein the fuel supply system is further provided with a supply section for supplying the fuel to the addition nozzle, the supply section is structured to be capable of changing a first pressure corresponding to a pressure of the fuel supplied to the addition nozzle greater than or equal to a second pressure corresponding to a pressure of the fuel supplied to the engine,
   wherein the control section judges whether it is possible to add the fuel at the amount to be supplied from the addition nozzle in one cycle of the engine within the fuel adding period on the assumption that the first pressure is set to the same value as the second pressure, and
   wherein the control section controls the supply section in such a manner as to increase the first pressure in the case that a result of judgment is negative.

4. The fuel supply system according to claim 1, wherein the engine is a V-type engine having a left bank and a right bank, wherein the addition nozzle, the exhaust manifold, and the catalyst device are each one of a pair, wherein each addition nozzle and each exhaust manifold are provided in correspondence to one of the banks, and each catalyst device is provided in one the exhaust manifolds.

5. The fuel supply system according to claim 1, wherein the control section sets a fuel injection timing by the addition nozzle on the basis of a crank angle of the engine.

6. The fuel supply system according to claim 4, wherein the injection timings of the addition nozzles are set to the same timing with each other.

7. A fuel supply method for an exhaust purifying catalyst device in an internal combustion engine, the engine including:
   a plurality of cylinders each having an exhaust port;
   at least one exhaust manifold, each exhaust manifold being connected to the exhaust ports of the cylinders;
   an exhaust passage connected to the exhaust manifold; and
   a catalyst device having a catalyst provided in the middle of the exhaust passage,
   wherein in the exhaust manifold, there exists a non-exhaust period in which none of the cylinders corresponding to the exhaust manifold is in an exhaust stroke, whereby exhaust gas does not flow out to the exhaust passage from the exhaust manifold when the engine is in operation, the fuel supply method comprising:

injecting the fuel to the exhaust manifold in a period other than the non-exhaust period from an addition nozzle, for activating the catalyst, setting a fuel adding period of the addition nozzle so as to divide the fuel adding period into a first half portion and a second half portion so that the period exits before and after the non-exhaust period, and controlling the addition nozzle in such a manner as to add the fuel in the first half portion and the second half portion.

8. A fuel supply system for an exhaust purifying catalyst device in an internal combustion engine, the engine including:

eight cylinders each having an exhaust port, four cylinders forming a first bank, and another four cylinders forming a second bank;

a first exhaust manifold connected to the exhaust ports of the cylinders of the first bank;

a second exhaust manifold connected to the exhaust ports of the cylinders of the second bank;

a first exhaust passage connected to the first exhaust manifold;

a second exhaust passage connected to the second exhaust manifold;

a first catalyst device having a first catalyst provided in the middle of the first exhaust passage; and a second catalyst device having a second catalyst provided in the middle of the second exhaust passage, wherein in the first exhaust manifolds, there exists a first non-exhaust period in which none of the cylinders of the first exhaust manifold is in an exhaust stroke, whereby exhaust gas does not flow out to the first exhaust passage from the first exhaust manifold when the engine is in operation, wherein in the second exhaust manifolds, there exists a second non-exhaust period in which none of the cylinders of the second exhaust manifold is in an exhaust stroke, whereby exhaust gas does not flow out to the second exhaust passage from the second exhaust manifold when the engine is in operation, wherein the fuel supply system comprises:

a first addition nozzle injecting a fuel to the first exhaust manifold for activating the first catalyst;

a second addition nozzle injecting a fuel to the second exhaust manifold for activating the second catalyst; and a control section controlling the first addition nozzle so as to add the fuel to the first exhaust manifold in a period other than the first non-exhaust period, and controlling the second addition nozzle so as to add the fuel to the second exhaust manifold in a period other than the second non-exhaust period, wherein the order of the compressive combustion of the cylinders is set to be asymmetric between the first bank and the second bank.

9. The fuel supply system according to claim 8, wherein the cylinders in the first bank are a first cylinder, a third cylinder, a fifth cylinder and a seventh cylinder arranged in order, wherein the cylinders in the second bank are a second cylinder, a fourth cylinder, a sixth cylinder and an eighth cylinder arranged in order, wherein the order of the compressive combustion of the first to eighth cylinders is set to an order of the first cylinder, the second cylinder, the seventh cylinder, the third cylinder, the fourth cylinder, the fifth cylinder, the sixth cylinder and the eighth cylinder.

* * * * *